April 19, 1938.  R. M. BERGSTEIN  2,114,621
MECHANISM FOR FORMING CONTAINERS
Filed July 27, 1936  7 Sheets-Sheet 1
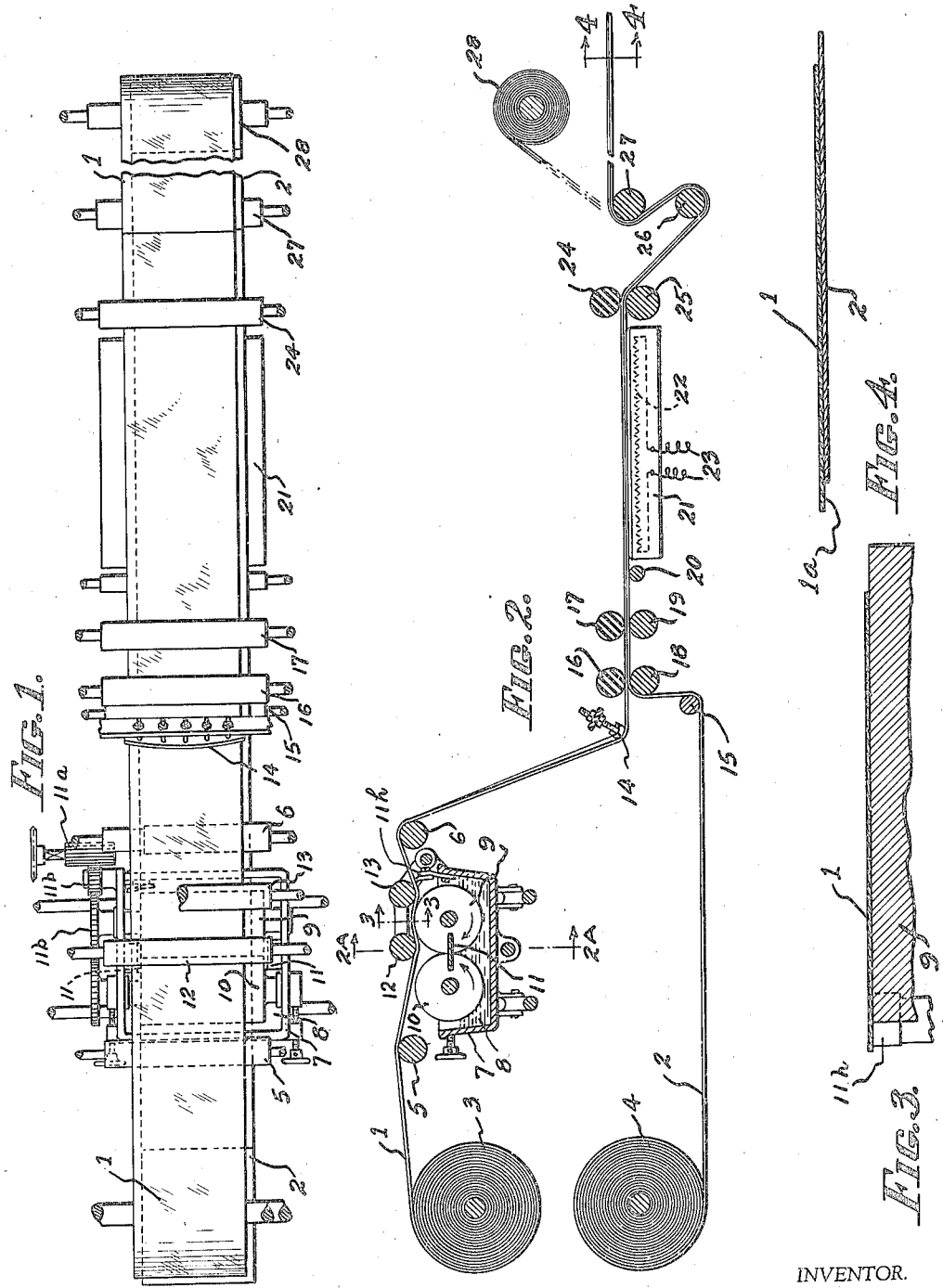
INVENTOR.
ROBERT MORRIS BERGSTEIN.
BY
ATTORNEYS.

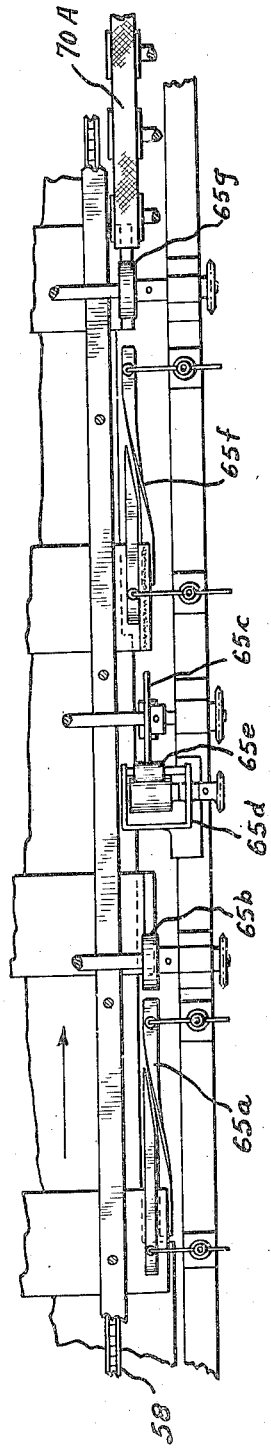
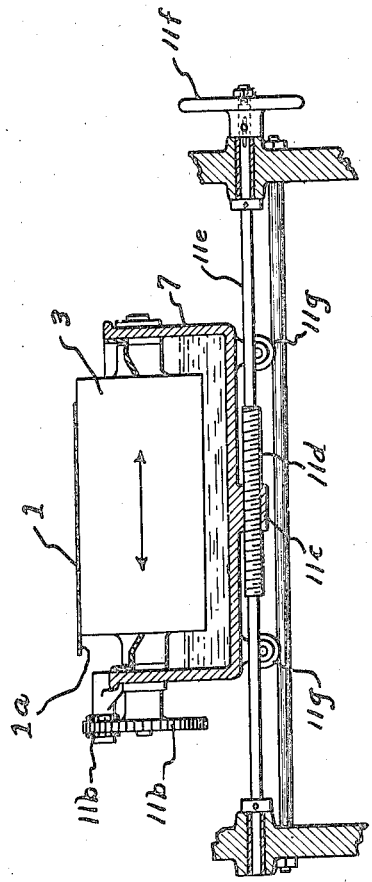
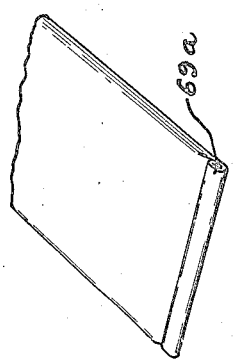

April 19, 1938.  R. M. BERGSTEIN  2,114,621
MECHANISM FOR FORMING CONTAINERS
Filed July 27, 1936   7 Sheets-Sheet 3
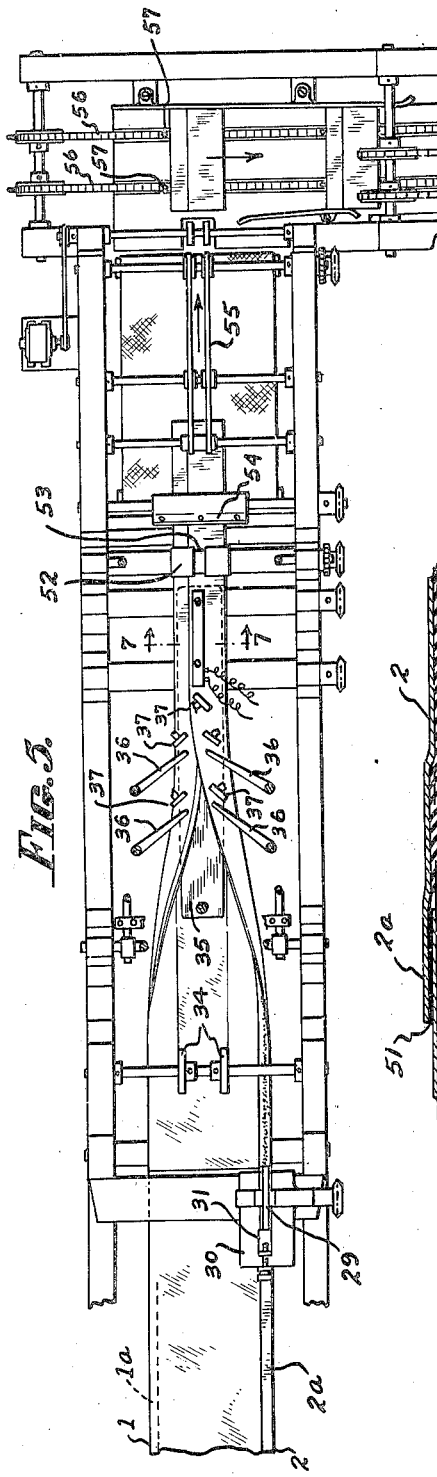
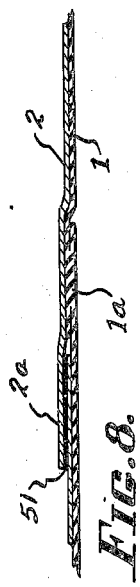
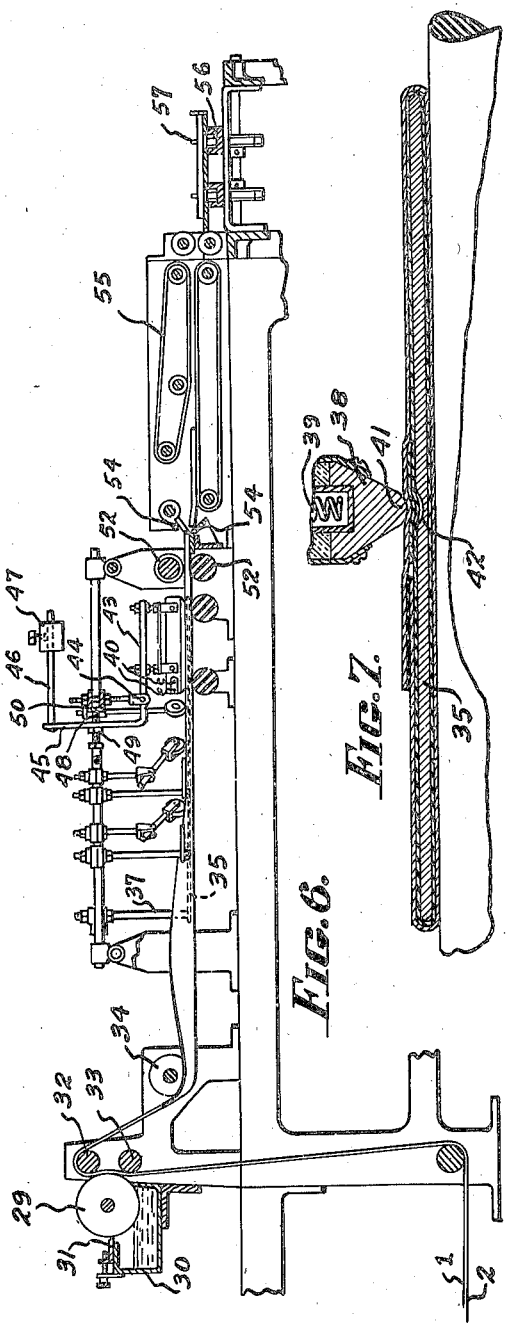
INVENTOR.
ROBERT MORRIS BERGSTEIN.
BY
ATTORNEYS.

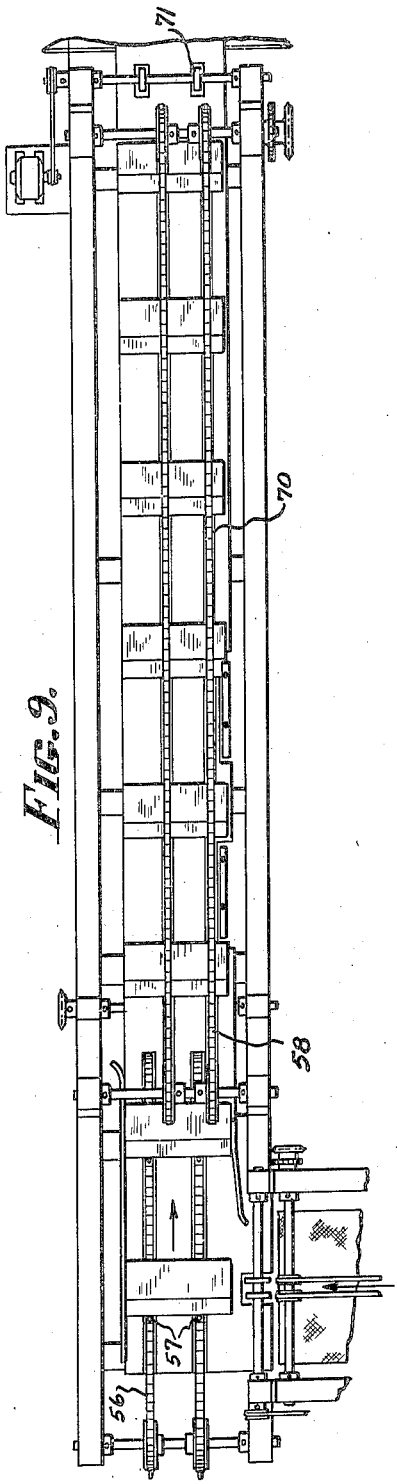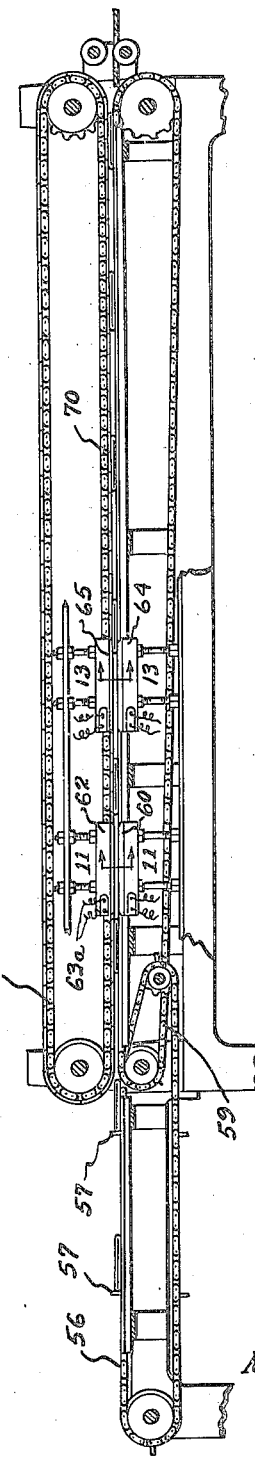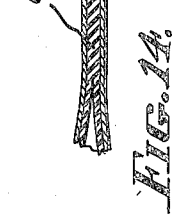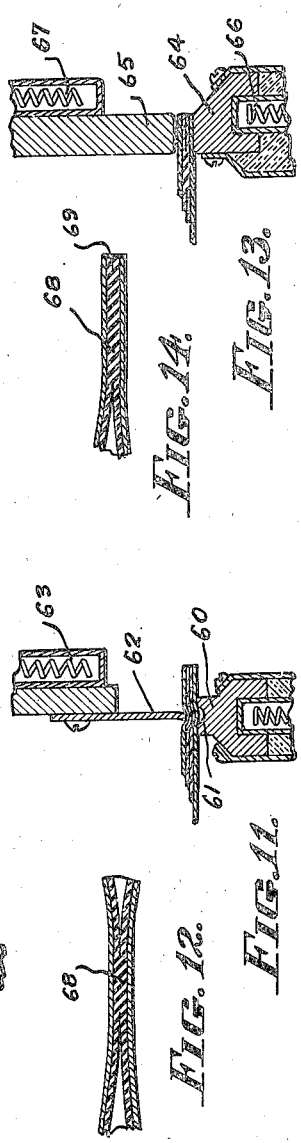

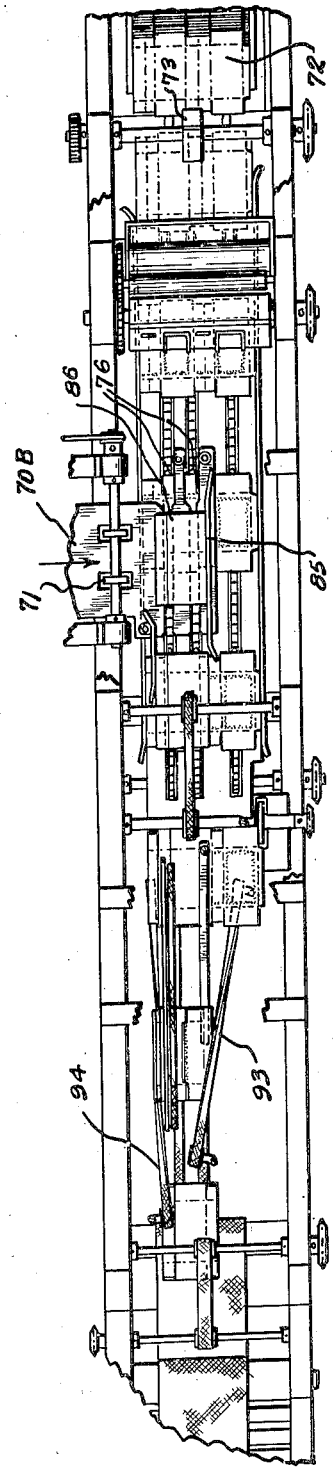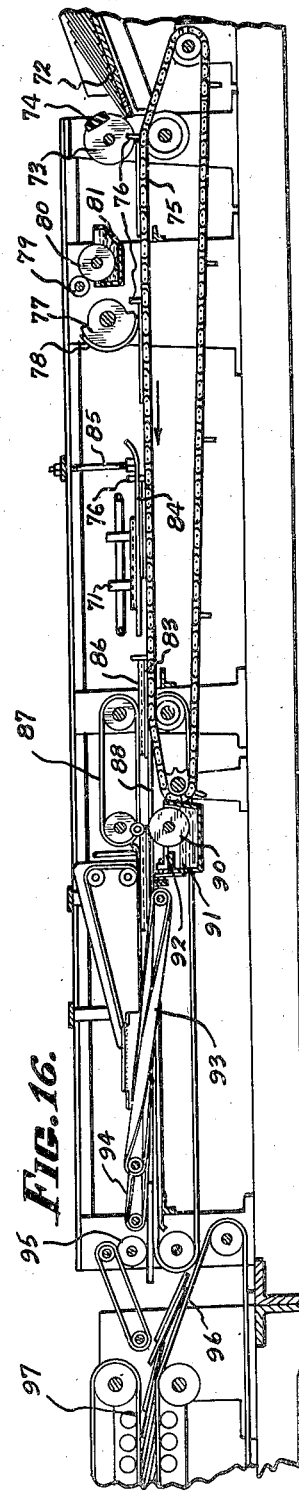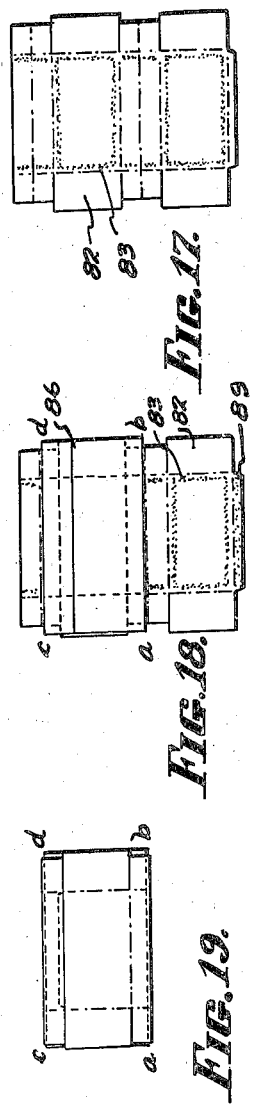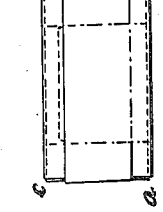

April 19, 1938.　　　R. M. BERGSTEIN　　　2,114,621
MECHANISM FOR FORMING CONTAINERS
Filed July 27, 1936　　　7 Sheets-Sheet 6
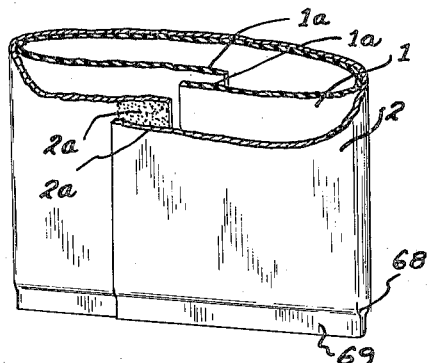
FIG. 20.
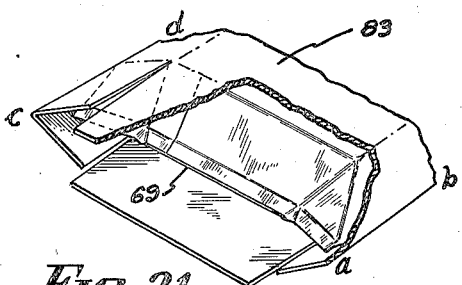
FIG. 21.
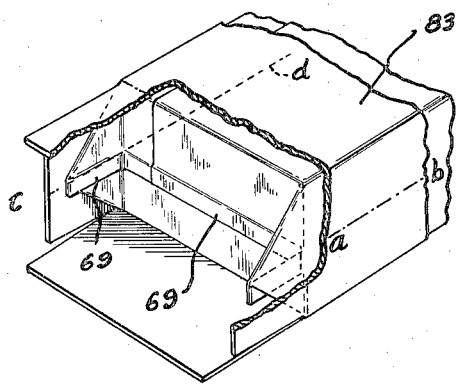
FIG. 22.
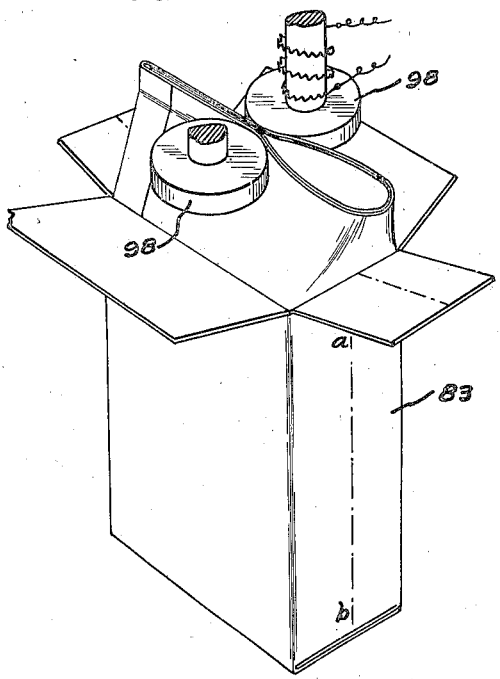
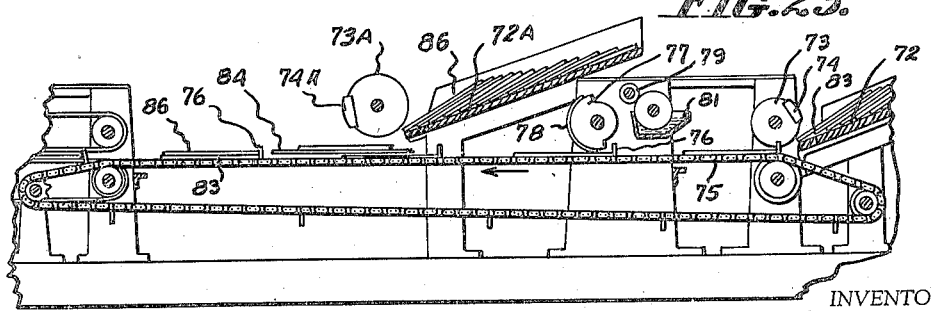
FIG. 23.
INVENTOR.
ROBERT MORRIS BERGSTEIN.
BY
ATTORNEYS.

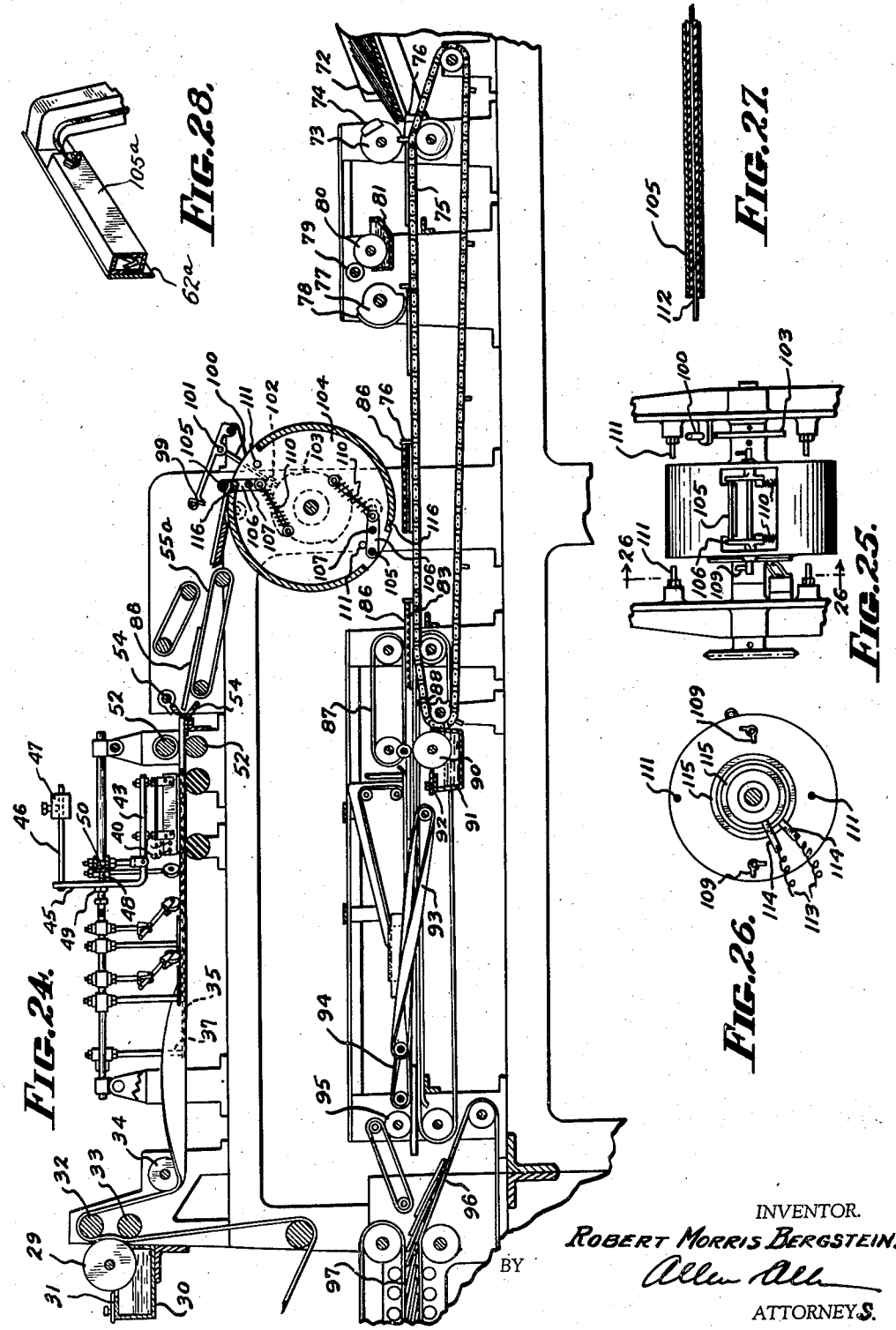

Patented Apr. 19, 1938

2,114,621

UNITED STATES PATENT OFFICE 2,114,621

MECHANISM FOR FORMING CONTAINERS

Robert Morris Bergstein, Cincinnati, Ohio, assignor to Edna May Bergstein and himself, as trustees Application July 27, 1936, Serial No. 92,706

20 Claims. (Cl. 93—18)

My invention relates to mechanism for forming cartons with bags enclosed therein, which cartons are adapted to be formed and shipped in knocked down or flat folded form, and for subsequent use in the packaging of materials where air tight and moisture proof packaging is required.

This application is related to my co-pending applications, Serial No. 43,569, filed Oct. 4, 1935; Serial No. 62,324, filed Feb. 4, 1936, and Serial No. 66,650, filed March 2, 1936, and is supplemental to the method of forming containers as set forth in my co-pending application, Serial No. 89,539, filed July 8, 1936.

In the first noted of my co-pending applications, I have disclosed a flat container construction in knocked down form, designed to be squared up into box form, comprising an outer receptacle element and an inner element, the outer element being a tubular blank having closing flaps attached to the walls thereof by hinge lines, said inner element constituting an open ended flat bag made of flexible material impervious on the inside at least, the closed end of the bag extending beyond the hinge lines adjacent to the flaps but unsecured to the flaps at one end of the outer receptacle, and sealed independently of the sealing of these flaps, the walls of said flexible bag being adhesively secured to at least a plurality of the walls of the outer structure in such a manner as to cause the flexible bag to be pulled open upon squaring up the whole structure, the open end of the bag projecting beyond the hinge line thereof and unsecured to the closing flaps at the other end of the outer structure, the interior at least of the flat bag being formed of heat sealable material, and the only intervening material in all seams forming the bag being fused portions of the said material.

The outer receptacle element is preferably tubular and preferably made of relatively stiff carton material. The open ended flat bag may be made either of one or more plies of flexible material. The squaring up of the outer receptacle which, because of the adhesive joining of the inner bag to the receptacle walls, causes the inner bag to be squared up has the additional advantage that after filling, the bag with the contents inserted is prevented from shifting or sliding around. The construction thus preserves the inner bag from injury which may be caused by the stress of shifting contents during transportation, the stress and strain in the construction referred to being sustained by the outer carton material.

In the second application noted, I have disclosed a container in flat folded form capable of being erected or squared up, comprising a carton having closure flaps at each end and collapsed on medial fold lines in two opposed walls thereof, and a bag within said carton having its longitudinal edges parallel to the medial fold lines and lying between them, and its open end projecting free of the closure flaps of the carton at one end, and being sealable independently of the closure flaps.

One of the main advantages of this construction is that, as the container is squared up, one pair of opposing walls moves in parallel alignment in opposite directions thereby opening bag evenly and bringing the bottom portion into erect position without distortion to form a fifth or bottom wall of the liner substantially at right angles to the walls of the outer structure. The bag preferably is positioned so that when the structure is erected its bottom wall is approximately bounded by the lines of articulation of the closing flaps, so that when these flaps are closed they support the bottom of the bag and prevent any independent stress from the contents of the package thereon.

In the third noted application, I have disclosed a method of forming a plural ply bag which consists of forming a tube of paper about a ply of thin heat fusible flexible material, folding the edges of the tube of paper and the inner ply respectively in overlapped relation extending in spaced parallel alignment longitudinally of the tube and adhesively securing the overlapped edges of the paper and heating the paper sufficiently to cause fusion of the overlapped edges of the inner ply, and applying heat transverse the bag at the bottom thereof to form a heat sealed hermetic closure for the bag bottom. The top or opposite end of the bag is further intended to be sealed by the same method after the contents are inserted therein.

The method disclosed in the aforenoted application consists in combining paper with a thin heat fusible material in offset relation so that the paper material extends beyond the heat fusible material at one edge, and the heat fusible material extends beyond the paper material at the other edge, so that in forming the tube the projecting edge of the heat fusible material comes in overlapped relation with the opposed edges of the heat fusible material, and the projecting edge of the paper material is also overlapped relative to the opposite edge of the paper material. The tube thus formed is moved in a direction parallel with the length of the tube and the overlapped paper edges are adhesively secured and the overlapped edges of the heat fusible material are united by means of heat, the heat being of a sufficient degree to penetrate through the paper and cause a fusion of the overlapped edges of the inner ply. The application of heat transverse the tube at one end thereof causes a heat sealed hermetic closure for the bag bottom.

In my co-pending application, Serial No. 89,539 filed July 8, 1936, of which this application is a companion case, in so far as it relates to the mechanism employed for practicing such method in an automatic machine, I have disclosed a method of container manufacture which consists in providing flat bags closed at one end, providing cut and scored carton blanks, and depositing the bags on the blanks while flat in predetermined position, and then folding the blanks around the bag and securing the blanks in flat tubular form, adhesive being introduced between the bag and carton on at least two opposite panels of the carton.

It is the object of my invention as set forth herein, to provide mechanism for forming a finished container ready for shipment, in flat knocked-down condition, the steps of manufacture made possible by such mechanism and the various modifications to be described consisting in first combining the plural ply material from which the bag is made, then making the tubular bag, applying adhesive and properly positioning such bag on the flat carton blank and then folding the carton blank to enclose the bag, the entire process being carried out while the bags and cartons are in flat knocked down condition. While the mechanism includes a laminating machine for combining the heat fusible material with the paper backing portions of the mechanism can be adapted for use with single ply material, at least the inner surface of which is heat fusible, or a single ply material out of which bags or tubular liners may be formed and its seams joined by means of adhesive, both the longitudinal as well as the end seam.

The above broad objects and other specific objects to which reference will be made in the accompanying drawings, I accomplish by that certain combination and arrangement of parts of which I have illustrated a preferred embodiment with several modified mechanical arrangements by which the broad objects as hereinbefore set forth, may be accomplished. The combination and arrangement of parts in the mechanism depicted, is a preferred typical construction, which will enable others schooled in the art to fully apprehend the underlying features of my invention in the various ways contemplated thereby.

In the laminating machine portion of the combination illustrated, specific objects of the construction shown are the provision of a laterally adjustable coating roll and a scraper blade for removing excess adhesive, first on the adhesive applying roll and secondly from the surface of the heat fusible ply after the adhesive is coated thereon. In the bag machine which forms part of the combination, specific objects of my invention are the provision of means for heat fusing the longitudinal seam in the tubular material by curving the overlapping edges in a concave-convex manner and applying heat to thus cause fusion without bringing any positive compression to bear on the seam portion of the material. Also it is my object to provide means whereby the freshly softened fusible material is not compressed by the coaction of the cooperating drawing members and further to form a bottom closure by adjoining surface fusion at designated positions.

It is one object of my invention to provide mechanism in which the draw rollers in the tube forming mechanism do not apply pressure to the longitudinal freshly fused seam, both the curving while heat fusing and the absence of pressure on the freshly fused portion being important to prevent disruption and injury to the heat fusible material. A further object in the bag machine is the curving of the seamed portions of the material coincident with the application of heat thereto.

The arrangement of the mechanism indicated in the bag forming machine may be adjusted and rearranged so that after the tube has been formed the transverse seal may be effected either before or after the tube is severed to desired length; or the material may be severed to desired length prior to forming the tube, thereafter forming the tube and effecting the transverse seal.

The mechanism for the transverse seal of the tube will be the same in any of the foregoing instances, in all of which the important closure principle is the face to face juncture of opposing walls by heat fusion to form an interior of an essentially integral nature. Thus any folding manipulations with the introduction of adhesive are not essential for the bottom closure, but may be used in addition if desired, either before or after or coincidental with the face to face fusion.

In the manufacture of bags it will further be possible to use one or more plies of paper or nonfusible material, forming the bottom closure by double folding and using adhesive, for example as shown in Samuel Bergstein's application, Serial No. 515,275, filed Feb. 12, 1931.

The machine for combining the preformed liners and carton blanks is such that both the blanks and liners are combined by mechanism set in timed relationship. The adhesive applying mechanism may be employed to apply adhesive to at least two opposing main body walls of the blank, or the corresponding exterior portions of the bag. The mechanism further deposits the preformed bags in predetermined position on flat carton blanks; the mechanism then folds the blank around the bag and joins the glue seam of the carton. Pressure mechanism then accomplishes the double purpose of affixing the bag to the blank and of securing the glue seam of the blank.

My invention consists either in the operably independent mechanisms of the laminating machine, the bag forming machine, and the carton and liner combining machine, or in the combination of any or all of these machines to operate in synchronization as a continuous unit. With the carton and liner combining machine any type of bag machine may be used in addition to the particular bag machine described, as for example the ordinary grocery bag machine may be connected in timed relationship with my carton and liner combining machine by any mechanic skilled in the art; or a supply of bags or preformed liners may be placed in a hopper or supply holding device and thereafter moved in timed relation by mechanism adjusted in a manner similar to that by which the carton blanks are removed, and thereafter carried in timed relationship.

Fig. 1 is a plan view of the mechanism for combining plural plies of bag material, which in the illustration shown, is composed of a sheet of thin heat fusible material forming the inner surface of the bag, and paper stock as an outer material to reinforce the thin, relatively weak, fusible material. Any heat sealable or fusible material can be used, as, for instance, a sheet rubber material known on the market as "Pliofilm".

Fig. 2 is a side elevation of the mechanism shown in Fig. 1.

Fig. 2A is an enlarged view showing the adjustable glue pot mechanism by which the application of adhesive to one of the plies of material may be controlled.

Fig. 3 is a sectional view taken along the line 3—3 in Fig. 2.

Fig. 4 is a sectional view taken along the line 4—4 in Fig. 2.

Fig. 5 is a plan view of the mechanism for forming the bag.

Fig. 6 is a side elevation of the mechanism illustrated in Fig. 5.

Fig. 6A is a plan view of a bag bottom forming mechanism which may be incorporated as a modification of the particular machine illustrated, and which operates on a principle similar to the machine illustrated in the application, Serial No. 515,275, filed Feb. 12, 1931.

Fig. 6B is a perspective view of a bag having the bottom folded in a manner possible on the modified embodiment of the machine illustrated in Fig. 6A.

Fig. 7 is an enlarged sectional view taken along the lines 7—7 in Fig. 5.

Fig. 8 is an enlarged lateral sectional view showing the longitudinal seam joint in the bag.

Fig. 9 is a plan view of the mechanism wherein the end seam is formed in the bags as they are fed along the conveyor.

Fig. 10 is a side elevation of the mechanism shown in Fig. 9.

Fig. 11 is an enlarged detailed sectional view taken along the lines 11—11 in Fig. 10.

Fig. 12 is an enlarged sectional view of an end of a bag showing the fused end seal.

Fig. 13 is an enlarged sectional view taken along the lines 13—13 in Fig. 10.

Fig. 14 is an enlarged sectional view showing the completed end seal of the bag bottom.

Fig. 15 is a plan view of the mechanism for uniting the bag with the carton.

Fig. 16 is a side elevation of the mechanism shown in Fig. 15.

Fig. 17 is a plan view of a carton blank after the application thereto of adhesive.

Fig. 18 is a plan view of the carton blank after the positioning of the bag thereon.

Fig. 19 is a plan view of the carton after it is sealed in knocked down condition ready for delivery.

Fig. 20 is a perspective view showing the bottom of a preferred type of bag made in my mechanism.

Fig. 21 is a perspective view showing the bottom of a carton after the bag has been inserted therein.

Fig. 22 is a perspective view of the bottom of the carton showing the way the bag conforms to the shape of the carton when it is set up.

Fig. 23 is a perspective view showing one method of sealing the top walls of the bag after the contents has been inserted therein.

Fig. 24 is a side elevation of a modified type of mechanism in which the end seal is formed during the passage of the bag in a circular path.

Fig. 25 is an end elevation of the bag bottom sealing mechanism.

Fig. 26 is a sectional view taken along the lines 26—26 in Fig. 25.

Fig. 27 is a longitudinal sectional view of the end sealing bar shown in Figs. 24 and 25.

Fig. 28 is a perspective view of a modified type of end sealing mechanism which may be substituted for the bar shown in Fig. 27.

Fig. 29 is a diagrammatic side elevation showing mechanism which may be substituted for the bag feeding mechanism in Fig. 16 wherein the formed bags are fed to the carton blanks from a hopper.

Heat fusible web material is indicated at 1 and the paper backing sheet at 2, the respective webs being shown as originating in the rolls 3 and 4 respectively.

As the web of heat fusible material moves from the supply it passes over a roller 5 and a roller 6. The glue applying mechanism is positioned between the two rollers and consists of the supply tank 7 within which the adhesive 8 is shown. The film of adhesive is carried up in a clockwise direction on the feed roller 9, and the thickness of the film is controlled by the doctor roller 10, which is in substantially peripheral engagement with the adhesive supply roller. Scrapers 11 are arranged at the ends of the rollers 9 and 10 to prevent the accumulation thereon of any excess adhesive which might smudge over the "Pliofilm" border of the web which is to be heat sealed.

In Fig. 2A an enlarged sectional view of the manner of mounting the adhesive supplying device so that it will be adjustable laterally of the web, is shown. The pinion 11a which drives the glue roll 3, is quite wide, so that the intermeshing gears 11b one of which is directly connected to the shaft of the glue roller 3, may be adjusted widthwise relative to the face of the pinion 11a. The adhesive supply receptacle 7 has an internally threaded boss 11c, which boss is engaged by the screw thread 11d on the shaft 11e. The shaft 11e may be rotated by means of the hand wheel 11f causing the adhesive supply receptacle 7 together with the coating roller as a unit, to be moved to the right or left on the supporting rollers 11g. Thus the application of the adhesive may definitely be controlled so as to provide an edge band 1a, which is uncoated to a desired extent.

Despite the scrapers 11, occasionally the edges of the adhesive roller 3 build up an excessive amount of adhesive which is transmitted to the moving film 1. To prevent this a film scraper blade 11h is provided, which removes any excess of adhesive and gives an evenly distributed coating over the under surface of the web 1. The scraper 11h preferably having dull edges and being narrow, is made from hard rubber or fibre so as not to stretch or injure the web material. There being a tension in the web material, it offers sufficient resistance for the scraper to function in a very satisfactory manner.

Pressure rollers 12, 13, press down on the web as indicated in Fig. 2, so as to further control an even distribution of the adhesive on its surface. The mounting of the pressure rollers 12, 13, on brackets which may be swung upwardly, provides a simple means of withdrawing the web from the glue applying roller when conditions of operation of the apparatus make this necessary.

The heat fusible web after the application of adhesive thereto, which adhesive as has been noted, leaves one edge of the web uncoated, passes to the spreader guide plate 14, which guides and removes wrinkles and buckles from the "Pliofilm" web and causes its engagement with the paper or other backing material web 2, feeding over the roller 15. The two webs brought into surface engagement pass between the upper pressure rollers 16, 17 and the lower pressure rollers 18, 19. The pressure between the rollers 16, 18 and 17, 19 is only sufficient to cause a firm bond between the surface of the "Pliofilm" and the backing sheet.

The combined webs pass over the roller 20 and over the heating plate 21, which as indicated may have resistance elements 22 therein, supplied with current from the electric supply wires 23. The purpose of the heating plate is to partially dry and secure a firm bond between the two webs. From exposure to the heating plate the combined webs pass between the rollers 24, 25, under the idler roller 26, and around the roller 27, where the web is shown as being delivered to a supply roll 28.

The mechanism may be arranged to combine for example two narrow rolls of fusible material with one wide roll of backing material. Thereafter a slitter slits the backer material down the center. For example, a 20" wide roll of backer material may be combined with two 10" rolls of fusible material, leaving a two inch gap down the center of the backer material, so that one roll of fusible material would project 1" along one edge and the other roll of flexible material would project 1" along the opposite edge. After having combined the webs in this relation, means may be provided to slit the backing roll down the center. This will make two rolls of combined material in offset relation. In cases where I do not have the laminating machine continuously connected up directly with the bag machine this arrangement will increase production. The mechanism may be arranged to accomplish the reverse of this wherein I combine one wide roll of fusible material and two narrow rolls of backer material. Any mechanism of known type may be used as long as the result is to produce a roll of materials of the nature described in offset relationship.

It is my purpose to arrange the mechanism for forming the plural ply bag material so that it delivers directly to the mechanism for forming the bags, and referring to Fig. 5, it will be observed that the combined webs feed directly to the tube forming mechanism. If desired, however, the mechanism for forming the laminated stock may be fed from the laminating machine to a secondary supply roll, from which it may in turn be fed to the bag forming machine. It will further be obvious that instead of forming a plural ply material and feeding this to the bag forming machine, I may prefer to employ a single ply material, the inner surface of which has been so conditioned or treated as to be heat fusible, while the outer surface remains non-heat fusible, and may require the presence of adhesive to form the lengthwise seam wherein a heat-fusible surface is joined to a non-heat-fusible surface. It will further be obvious that instead of forming a plural ply material and feeding this to the bag machine, I may employ any material that is heat sealable on the interior at least, forming the longitudinal seam by fusion or adhesion and then forming a bottom closure by face to face juncture of opposite walls, said juncture being secured by heat fused portions of said material. If non-heat sealable material, like paper, is employed, the long seams may be formed by adhesively securing opposite walls in the presence of heat. Heat and pressure may also be employed for forming the bottom seam. The end closure may also include a folding manipulation in which adhesive is employed for securing the folds together.

In Fig. 3 a sectional view of the adhesive applying roller is shown illustrating how the border edge of the "Pliofilm" web is left uncoated, and also illustrating why it is important to have the scrapers 11 prevent the formation of excess gobs of adhesive at the end edges of the adhesive supply roll.

Fig. 4 shows the combined webs in the condition in which they are delivered to the bag forming mechanism, the overlapping edge 1a of the "Pliofilm" web being such that when the web is formed into a tube, the "Pliofilm" can overlap and be vulcanized with the opposite edge of the "Pliofilm," in the manner suggested in my application, Serial No. 66,650, filed March 2, 1936.

Referring now to Fig. 5, the web feeds along and adhesive is applied to the extended edge 2a of the paper or backing by means of the adhesive applying disk 29, which is mounted in an adhesive supply tank 30. The thickness of the film on the adhesive applying disk is regulated by means of an adjustable doctor blade 31. The plural ply web is held against the adhesive applying disk by means of rollers 32, 33. The combined webs then pass to the tube forming mechanism which consists primarily forming rollers 34, which are spaced so as to prepare the web for its final folding over the forming plate 35.

Since the web is being pulled lengthwise over the forming plate, the folding over of the web is accomplished by spaced fold bars 36, and diagonally arranged rollers 37. The rollers 37 are not driven but merely rotate with contact with the web and because of the particular tendency of such a web to buckle, I find for practical commercial purposes that the fold bars 36 and 37 provide an adequate mechanism for accomplishing the necessary folding in operation. The particular mechanism shown is however, not essential, as other types or known types of blades and bars may be employed to accomplish the same purpose.

After the combined extension of the paper of bag material, to which extension adhesive has been applied, moves into contact with the opposite edge of the bag paper, and the surface of the heat sealable material and the uncombined extension of the heat fusible material are folded into independent overlapping relation with the opposite edge of the heat fusible material as set forth in my application, Ser. No. 66,650, the overlapped portion of the now flat formed tube is moved into mechanism which fuses the overlapping lines of the heat fusible material into an integral ply or liner.

To accomplish the fusing of the tube seam, I have provided a heating element, best illustrated in Fig. 7, and indicated at 38. A resistance element 39 provided with electric current, from the supply wires 40, heats the upper fusing or vulcanizing element to a proper temperature, a rheostat being provided if desired, to control this temperature to the exact degree required.

I prefer to have the lower edge 41 of the upper fusing element formed on an arc of a circle about $\tfrac{1}{16}$ of an inch in radius, and positioned slightly below the surface of the flat forming plate 35, wherein is provided a corresponding groove 42, slightly larger in radius than the edge 41 of the heating element, curving the tube formation on the line or band where the heat fusible material overlaps and to move the material in a longitudinal curved formation and while so curved to apply heat. It is understood that the arc of the groove in the forming plate or the arc of the edged heating element 41 may be used in any desired radius or form to accomplish the result. The above described elements are shown as being preferred form. It is understood, however, that such fusion of overlapping edges of heat fusible material not having any backing can be accomplished in the same manner.

The corners of the outer surface of the concave element contact the bag material on parallel lines with a space therebetween; the convex element contacts the opposite side of the material on a line approximately in the center of said parallel lines with a sufficient space between the convex and concave elements so that free passage of the material is permitted. Thus injury to the freshly heat softened seam in the material is avoided, the convex element projecting sufficiently into the concave to curve the material from its normal plane of travel. It is the convex element which causes the curving in the seam portion, the concave element merely providing a support for the material at the side edges and clearance between the edges in which the material is curved.

The heating element in the preferred practice is mounted above the forming plate. Such arrangement may be reversed and the forming plate may be provided with a groove on the under surface, and a heating unit placed underneath the forming plate. I may further combine or fuse, both underneath and from above either simultaneously or alternately. In the preferred form the upper heating element is mounted on an arm 43 pivoted at 44 and with an arm 45 extending upwardly and connecting the horizontal arm 46 on which a weight 47 is adjustably mounted to maintain the heating element in desirable fusing position.

For providing a variable adjustment for the upper heating element 38, I have indicated a bolt 48 secured in position by means of a nut 49, the end of the bolt 48 bearing against a bracket 50. By varying the adjustment of the bolt 48, a desired location of the element 38 against the web may be secured, it being understood that there is no direct frictional downward pressure of the element 38 in the groove 42 other than such contact as is required to tension the seam of the web by guiding it into a curved formation.

I have illustrated the type of seam joint which is provided by this mechanism, the overlapping portions of the fusible material 1a being fused into an integral inner liner and the overlapping portions of the paper or backing material, with an adhesive 51 applied therebetween, being pressed together and adhesively secured together by means of pressure rollers 52. It will be noted that these pressure rollers perform two functions: the first, as draw rolls, drawing the bag material, and the peripheral speed thereof determining the relation to the cut off knife, thus controlling the length of the tube to be cut off. Secondly, on the other hand, in order to draw the rollers they necessarily have to press the formed tube in between them. The newly fused longitudinal joint, still being in a plastic state, having but a short interval before being heated by the heating element, would become injured or distorted if pressed immediately after the heat fusion was effected. It is for that reason that a groove 53 is provided between two draw or pull rollers in the illustrated showing, corresponding with the longitudinal fusing line so that these rollers press the tube on such surface where no injury can result. A split draw roller or spaced draw rollers will accomplish this same purpose. Where the newly formed fuse joint has been made, due to the groove, no pressure will be exerted, thus leaving the newly fused joint unaffected by whatever pressure may be exerted in drawing the tube material.

The continuous tube thus formed is then severed or perforated by means of the fly knives 54, and delivered to the conveyor belts 55, which deliver the severed bags in sequence to the cross conveyor chains 56, having pins 57 which pick up the severed tubes and convey them, preferably at right angles to their previous line of travel.

The severed tubes thus formed are open at both ends and the next mechanism required is that which forms an end seam in each bag as it passes along. The severed tubes are delivered from the chain conveyor 56 to the cooperating upper and lower conveyors 58 and 59, and it is during the movement of the individual tubes through these conveyors that the end sealing is accomplished.

In Fig. 11, I have shown an enlarged sectional view illustrating the preferred type of sealing mechanism for sealing one end of each tube. It will be understood that in this position it is the object to fuse the opposing inner surfaces of heat fusible material to one another at least at one end thereof and the heat in this instance also is transmitted through the outer paper material or backing material of the tube.

A heated fusing element 60 is shown having a groove 61 in its upper surface which again may be of a radius of a circle of approximately $\frac{5}{16}$ths of an inch. A downwardly extending element 62 having rounded edge slightly smaller than the groove 60 to allow sufficient space in between said elements to permit the tube end of the material to travel therebetween without pinching or pressing, and thus avoid injuring of the freshly heated or molten heat sealable liner, said edge being held in position in said groove slightly below the upper surface of said grooved element, causing a sure contact of the inner opposite faces of the ends of tubes by curving as the ends thereof move between the operating tongued and grooved elements. Heat is applied while the material is so curved. Either the upper or lower element may be provided with heat, or both, by means of a resistance element illustrated as 63, to which current is applied from electrical supply wires 63a.

While it is not essential to provide a further closing of the heat fusible material, I find it desirable to form a complete seal at the bottom of the bag, which seal I have illustrated as being formed by means of the heating devices 64 and 65, containing the resistance elements 66 and 67 respectively. Thus the bottom seam of the bag is first fused by the mechanism illustrated in Fig. 11, in which a fused seam 68 is provided, and then by passage through the heating members 64 and 65, in which the fusing devices unite the laps additionally at sides of the initial joint forming a complete bottom seam 69, as illustrated in Fig. 14. If so desired, the end so fused may be folded over either once or twice or more, and such folded portions may then be adhesively secured to the main body portion of the bag. The end of the tube may also be folded prior to the application of heat thereto.

In Fig. 6A, there is illustrated mechanism which may be incorporated at the delivery end of the mechanism illustrated in Figs. 9 and 10. Thus the conveyor carries the tubes along and one end of the tubes engages the turn over plate 65a. This forms a first fold in the bag material which is held down by means of the rollers 65b. Adhesive is then applied to the outer surface of the single folded portion by means of an adhesive disk 65c, which receives adhesive from a supply reservoir 65d, and adhesive applying rollers 65e.

The conveyor chain continues to move the bag laterally until the fold portion of the back bottom is again folded by means of a second turnover plate 65f. A pressure roller 65g then completes the seal of the double fold of the bottom of the tube, which is then delivered to the mechanism which will hereinafter be described. The tube will then have a doubly folded bottom seam 69a.

The bag now being completely formed and provided with end seal is then delivered to the carton folding mechanism by means of the conveyors 58, 59 to carry and deliver these bags in timed relation with timed movement of the flat unfolded carton blanks. The mechanism is illustrated in Figs. 9 and 10, which show a conveyor longer than is necessary as indicated at 70, the additional length being provided to permit the freshly fused joints to cool before they are delivered onto the flat unfolded carton blanks. Where the structure of Fig. 6A is used, a conveyor 70A serves this purpose. The delivery rolls 71 deliver the sealed bag to the carton blank which mechanism is herein described, which forms part of at least the tube and bag forming mechanism, which may also be a part of a machine performing all these functions: combining the bag material, forming tubes, cutting tube into sections, and forming end joints in said tubes. In Figure 15 the conveyor is numbered 70B. It will be understood that mechanism referred to as 70, 70A or 70B is mechanically equivalent, being a continuous type of liner conveyor. It is within the scope of my invention to substitute one type of conveyor for another in the various modifications all the conveyors shown being of old well known type.

In Figs. 15 and 16 the mechanism is shown for forming carton blanks in flat formation, with bags enclosed therein. The supply of carton blanks 72 is illustrated, from which the blanks are withdrawn by roller 73, on the periphery of which roller there is at least one pad (preferably rubber) 74. The roller as it rotates will withdraw from the supply of blanks, by means of the frictional surface of the rubber pad, the topmost blank, and the rotation of the roll, and particularly the relative position of the rubber pad is so timed and synchronized so as to deposit the carton so removed from the supply onto a chain conveyor 75, having pins thereon 76, which pins coming from behind the flat carton blanks so deposited on the conveyor move same individually in proper timed relation with the other mechanisms. As cartons pass along they are glued by the glue applying roller 77 having glue pad 78 arranged thereon, which pad picks up adhesive from adhesive supply roll 79, on which a film of adhesive is deposited from roller 80, which rotates within the adhesive supply tank 81.

In Fig. 17, I have shown a carton blank 82, the areas 83 being those to which adhesive is supplied by means of the glue pads 78.

The bags are delivered from the conveyor 70B by the rollers 71, to a supporting plate 84, supported from the frame of the machine by a bracket 85. There are slots 86 between parts of the plate 84 on which the bags are delivered by means of the roller 71, and as the pins 76 on the conveyor 75 come along they extend through the slot and move the bag and carton blank together until the bag moves off from over the support plate 84. In Fig. 15 guide bar 85 is illustrated which keeps the bag in proper alignment during its delivery onto the outer surface of the unfolded carton blank, on which adhesive areas are provided as illustrated in Fig. 17 and which when folded, are the inner surface of the flat carton.

In Figure 29 I have shown a hopper 72A which retains the bag liners which are withdrawn by means of a roller 73A having a draw-pad 74A which positions the bag liners on the supporting plate 84. The pins 76 on the conveyor 75 thus pick up the bag liners in proper position on the carton in a manner similar to that which occurs in the mechanism illustrated in Figure 15.

In Figure 18 the position of the carton blank after the bag has been positioned thereon, is illustrated, the completed bag being indicated at 86.

The carton blank and bag are then delivered together to the conveyor pressure belts 87, 88.

Adhesive is then applied to the under-surface of the tongue 89 of the carton blank.

The combined bag and blank then move to the mechanism which forms the carton in its finished flat condition, the application of adhesive to the under-surface of the tab 89 being by means of the adhesive disk 90, mounted in the adhesive supply tank 91, and on which the film of adhesive is controlled by means of the doctor blade 92.

Twisted belts 93, 94, next guide the articulated walls of the carton in a flat folded condition, the fold line being preferably first along the line a, b, illustrated in Fig. 18, and then along the line c, d, so that before the wall of the carton outside the line c, d, the tongue 89 carrying adhesive on one of its surfaces is folded down. Thereupon the completely sealed carton having the bag liner within it is delivered by pressure rollers 95 to the storage conveyor pressure belt 96. The cartons, ready for delivery, pass between the upper conveyor belt 97 and the conveyor belt 96, where the final drying of the adhesive sealed portions is effected.

To facilitate the understanding of the various parts of the mechanism illustrated and described, I have shown in Figures 20 to 23, the carton in its various stages of manufacture and use. Fig. 20 shows the bottom of the bag composed of the inner "Pliofilm" layer 1, having the overlapping edges 1a fused together. The outer paper or backing sheet 2 adhesively secured throughout its entire width to the "Pliofilm" layer 1, has overlapping edges 2a adhesively secured together so that the bag seam has the combined strength of the fused "Pliofilm" and adhesive paper or backing joint. The bottom seam of the bag has the fused joint 68 and the end edge joint 69.

In Fig. 21 the bag is shown within the carton blank. The two opposite side walls of the carton are divided medially by the fold lines ab, cd, and it is along these lines that the carton blank preferably is initially folded. The bag is so positioned on the carton blank and its bottom seam 69 extends sufficiently beyond the hinge lines of the sealing flaps with a sufficient overlapping margin so that when erected the bottom will rest on the closure flaps of the carton blank and the weight of the contents therein will be sustained by the closure flaps. This portion of the bag not being adhesively fastened to the closing flaps, when the carton is squared up, the portion extending beyond the hinge lines of the closure flaps will thereby be raised and formed into a fifth or bottom wall panel as shown in Fig. 22. The triangular formations on the two opposite sides which result from raising the sealed portion to form a flat bottom wall automatically become readily foldable simultaneously with the closing of the closure flaps. While the carton is provided with six crease lines, and folded flat on the medial lines referred to, when the carton is squared up and the closure flaps are folded, the whole structure assumes a rectangular formation.

Fig. 23 illustrates a perspective view of the final closure for the bag, prior to closing the top flaps of the carton. I have shown the heated seam forming rolls 98 forming a fused seam in the top walls of the bag. It will be preferable in many instances to form this bag seam by the use of mechanism such as is illustrated in Fig. 7 or 11, it being obvious that such mechanism is adaptable for forming the top bag seal.

In Figs. 24 to 28, I have illustrated an alternative mechanism for automatically forming the end seals for the bags while they are carried around in a circular path as by mechanism, the operation of which resembles in some particulars the operation of a printing cylinder in a rotary printing press.

The mechanism illustrated up until the bags are delivered to the conveyor belt 55 is identical with the mechanism illustrated and described in connection with Fig. 6. Thus the parts are supplied with the same reference numerals. The bag 80 supplied with the side seam and cut to length is delivered to the conveyor belt 55a. A stop bar 99 pivoted at 100 has an arm 101 which carries a cam rider element 102 which engages the cam track 103 carried by the drum 104. The arrangement is such that at properly timed intervals the cam surfaces of the track will cause elevation of the stop bar 99, permitting the bag to feed forward. At a proper interval relative to the feed of the bag, a clamp bar 105 snaps down and engages the band of the bag along which the bottom seal is to be made. The clamp bar 105 is mounted on brackets 106 pivoted at 107 and rocker fingers 109 cause the brackets to snap back and forward under the spring tension of the coil springs 110. The frame of the machine carries pins 111 which at proper intervals engage the rocket fingers 109 and cause the clamp bars to snap up to clamp the bags near the end.

The clamp bars 105 carry resistance elements 112 heated by current supplied from power wires 113, brushes 114 and contact rings 115. The clamp bars will ordinarily have a radius of about $\frac{3}{16}$ inch, and, as in the other mechanism, the drum has grooves 116 formed on a substantially similar radius so that the clamp bars, while exerting sufficient pressure to hold the bags during their passage around the drum do not cause any substantial frictional pressure.

The operation of the clamp bars on the delivery side is similar to that on the receiving side excepting during the delivery the clamp bars release the bag permitting it to drop in position on the carton blank, which as in the mechanism illustrated in Fig. 16, has had glue areas impressed thereon to receive the bag. The remaining mechanism illustrated in Fig. 24 is similar to the carton sealing mechanism illustrated in Figs. 15 and 16, so similar reference numerals are applied thereto without further description.

In Fig. 28 an alternative form of bag clamping device is illustrated, comprising the heated frame 105a carrying the clamping plate 52a. This modification is similar in effect to the mechanism illustrated in Fig. 11, and the operation by means of tripping mechanism similar to that which trips the clamping bar 105 will be apparent.

While I have shown mechanism for making a plural ply web, forming the plural ply material into a continuous tube, forming bags of the tubes, cutting the tubes to length and end sealing the bags, the sequence of operations has decided process aspects inasmuch as the web formation provides a particular type of bag. Inasmuch as a novel process and particular sequence of operations is shown, which is not inherent in the particular apparatus illustrated and described in the claims which follow, I propose to claim both the method shown and the particular apparatus which I have selected for forming the bags. The mechanism will further be adaptable for use with heat sealable material in a single ply formation. The fusing of the joints by means of curving the material and while so curved heat fusing both on the long and end seams is made possible with the mechanism shown even though the material is not laminated. The mechanism further is adaptable for use with single ply material wherein draw rollers are used having clearance to prevent injury to the newly formed seam.

As far as I am advised it has not previously been proposed to arrange a combining mechanism in which a preformed tube or bag of any type in flat preformed condition has been delivered in timed relation and adhesively secured on a flat carton blank and the carton walls folded and sealed about the preformed liner without the position of any of the walls of the bag being manipulated to complete the formation of the finished bag or tube lined carton. Heretofore it has been suggested to deposit flat liner blanks on carton blanks but mechanism accomplishing this operation has not been proposed for use with preformed tubes. In forming lined cartons heretofore the walls of the lining have been formed coincident with the folding and sealing of the carton blank. In my mechanism as illustrated the preformed tube is delivered on the blank and no further folding steps or other manipulation is required in connection with the tube or bag formation. Since this combination is new I claim the same broadly herein regardless of the specific type of the preformed tube or bag and regardless of the specific type of carton blank.

In my preferred method of heat sealing and in the mechanism provided the periphery of at least two edges of one element contacts one surface of the bag material where the seam is to be formed along parallel lines, with a space therebetween. The other element which causes the curving has at least one tongue which contacts the other surface of the material approximately at the center of the parallel lines, and space is provided between the tongued element and said edges, to permit the bag material to be readily drawn past these two elements, the tongue being placed slightly beyond the periphery of the two edges to cause a curving, and thus assure contact of opposite faces of bag material, without the material being compressed therebetween. Such pressure, when the fusible material has been melted by the heat carried by one of the two elements, or both, would result in distortion or injury to the thin, freshly softened, fusible material.

In depositing a flat unfolded sheet of lining material upon a flat unfolded carton blank, as has been the practice in the prior art, and in fastening the longitudinal seam of the lining material independently of the fastening of the overlapping edges of the carton blank, the best result that can be secured is a dependable seal of the longitudinal seam of the liner within the limit defined by the main body of the carton, but such portions of the lining material as extend beyond the main body of the carton, have seams which cannot be sealed dependably for the following reason: the overlapping of the carton is brought about by one edge extending the whole length of the carton blank while the other edge is limited to the length of the body of the carton, these two edges are overlapped and adhesively fastened, resulting in having three thicknesses of carton material at the seam the length of the main body panel but only two thicknesses over the rest of the area of the folded carton. Thus, these cartons, after having been so folded and having adhesive applied to the sealing flaps, are deposited between two belts moving slower than the surface speed of the carrying means which deposited these cartons upon them, thus resulting in the cartons being deposited one over another and overlying, one the other, within a fraction of their length. The two slow moving belts exert pressure upon the overlapping joints, but because of the greater thickness at the overlapping joints, which are limited to the main body of the carton, where the pressure is exerted upon that area, due to the three thicknesses of the carton material present, the rest of the surface gets little or no pressure, at least not sufficient pressure to dependably bring about adhesion of the seam of the liner beyond the main body portion of the carton. In sharp contrast my present invention contemplates the forming of a bag or the sealing of one end of the tube in addition to having a dependable seam longitudinally. In view of the fact that by pre-forming a tube, I contemplate the making of a package with the longitudinal seam of the liner securely fastened throughout its length, and furthermore having one of its ends dependably closed, no mechanical means for lining a carton blank with a flat sheet should be considered as equivalent to producing flat knocked down cartons having a tubular liner or bag enclosed therein as disclosed by my invention.

Since my liner is preformed I can make it any desired size, its size not being determined by the folding of the carton itself, and as a result I can have the area of the liner greater than that of the carton so that the full stress and strain of the contents within the liner, are exerted directly against the strong carton walls. Another important distinction is the fact that my liner may have a lateral seam with both the lengthwise and lateral seams secured independently of the sealed joints of the carton.

Having thus described my invention, what I claim as new and desire to secure by Letters Patent is:

1. Mechanism for forming lined bag material which comprises means for continuously feeding a web of heat fusible material, means for continuously feeding a web of backing material, means for continuously applying adhesive to one of the webs, means for continuously bringing the webs into surface attachment in offset registry wherein a border of the heat fusible web material extends beyond one side of the combined webs and a border of the backing material extends along the other, and means for continuously applying adhesive to the area whereby the border band of the backing material will lap the outside of the finished tube, and means for continuously forming the bag material into a continuous tube with the backing material band adhesively secured to an overlapped opposite edge of the backing web, and means for continuously fusing the border band of heat fusible material to an overlapping opposite edge of the heat fusible web material.

2. In tube forming mechanism wherein overlapped edges of heat fusible lining material and backing material are brought into overlapping registry with overlapping portions of the heat fusible material in engagement with heat fusible material and overlapping portions of the backing material adhesively secured together, means for continuously forming a fused seam of the overlapping portions of the heat fusible material, comprising a heated member having a contoured edge and a corresponding inwardly grooved cooperating member.

3. In tube forming mechanism wherein overlapped edges of heat fusible lining material and backing material are brought into overlapping registry with overlapping portions of the heat fusible material in engagement with heat fusible material and overlapping portions of the backing material adhesively secured together, means for continuously forming a fused seam of the overlapping portions of the heat fusible material, comprising a heated member having a contoured edge and a spaced corresponding inwardly grooved cooperating member, and means for adjusting the relative spacing of the fusing members.

4. In tube forming mechanism means for heat fusing a seam in heat fusible tube material having overlapping edges comprising a heated member mounted so as to curve the overlapping edges of the web from which the tube is formed in a convex curve and a cooperating member providing clearance for the curved portion of the tube.

5. In the tube forming mechanism means for heat fusing overlapping edges of heat fusible material, comprising a member having a convex edge and another cooperating supporting member having a clearance space opposite the convexity of said edge, adjustable means for co-ordinating the two members so that when the overlapping edge of the tube is curved by said convex edge and while said overlapping edges are in such curved condition heat is applied to at least one of the cooperating members to bring about the fusion of said overlapping edges.

6. In the tube forming mechanism means for heat fusing overlapping edges of heat fusible material, comprising a member having a convex edge and a supporting member having a clearance space opposite the convex edge, adjustable means for co-ordinating the two members so that when the tube with the overlapping edge is therebetween, a curvature is brought about and while said overlapping edges are in such curved condition heat is applied to at least one of the cooperating members to bring about the fusion of said overlapping edges and means providing clearance for the overlapping edges of the tube while curved by the co-ordination of the two members, whereby injury to said overlapping edges, due to the application of heat during the movement of said tube material through said co-ordinating members, is prevented.

7. Mechanism for making tubular bags of flexible sheet material having a heat fusible lining at least comprising means for continuously forming the web into tubular shape, means for imparting movement to the tube lengthwise of the same, means for severing said tube into tubes of predetermined length, and means for applying heat to the ends of the tubes to seal the same, comprising means engaging one side only of the tube at the transverse zone to which the heat is principally applied.

8. Mechanism for making tubular bags of flexible sheet material having a heat fusible lining at least comprising means for continuously forming the web into tubular shape, means for imparting movement to the tubular web lengthwise of the same, means for severing said tubular web into tubes of predetermined length, and means for applying heat to the ends of the blanks to seal the same, said means arranged to curve the material to deflect it from the plane of travel of the blanks coincident with the application of the heat thereto, and to apply heat substantially confined to said curved portion.

9. Mechanism for making bag material having a heat fusible inner surface comprising means for continuously feeding a ply of flexible material into contact with a ply of lining material and means for applying an adhesive coating between the plies, means for continuously forming a flat tube of the material and means for continuously forming a fused seam in the tube, said last mentioned means comprising means for guiding the tube from its plane of movement into a curved formation lengthwise of the tube and means for applying heat externally of the heat fusible lining to cause fusion of the heat fusible lining material.

10. Mechanism for making bag material having a heat fusible lining comprising means for continuously feeding a ply of flexible material into contact with a ply of lining material and means for continuously forming a flat tube of the material and means for continuously forming a fused seam in the tube, said last mentioned means comprising means for curving the tube from its plane of movement transversely to its length and means for applying heat to said curved formation to cause fusion of the lining of the tube.

11. A bag forming machine provided with means for receiving and carrying a flat tube of material, the inner surface at least of which is heat fusible, means for heat sealing a bottom seam in said tube during its movement, said means effective for heat fusing said seam throughout the entire width of said tube simultaneously said means arranged to engage one side only of the tube at the transverse zone to which said heat is applied.

12. A device for the purpose described comprising a forming plate, means for bringing heat fusible material into lapped tubular form about the same, said forming plate having a longitudinal recess therein extending parallel to and underlying the lap in the tube, and a heated member located so as to engage the material and push it into the said recess but insufficiently to bottom it so as to leave clearance, said heated member serving to fuse together the lapped portion of the material.

13. A device for the purpose described comprising a forming plate, and a contacting member, means for bringing heat fusible material into lapped tubular form about the forming plate, the said plate and member having one a recess and the other a projection in the plane thereof, relatively located so that the material where lapped when passing between them is deflected into the recess but does not bottom therein, and means for applying heat to the deflected portion to fuse the lapped portions together.

14. In a device for making seams between superposed surfaces of material folded around a tube-forming plate, means for deflecting an area of said superposed surfaces, means for supporting said surface adjacent but not opposite to the deflected area and means for applying heat to said area of deflection.

15. In a device for making seams between overlapped edges of material having heat-fusible surfaces, a tube-forming plate having depressions therein, means for deflecting an area of said overlapped edges into said depressions, and means for applying heat substantially to said area of deflection, and means for moving the material over the plate.

16. In a tube forming mechanism means for bringing overlapped edges of heat fusible lining material, and of backing material therefor into overlapping registry, with overlapping portions of the heat fusible material in engagement with heat fusible material and overlapping portions of backing material in engagement with backing material, means for applying adhesive between the overlapping backing material and means for applying heat through the backing material for forming a fused seam of the overlapping portions of the heat fusible material.

17. In a bag machine in combination with means for feeding material to be sealed, a supporting member over which the material is fed, having a clearance space therein, a guiding member having a convex guiding portion arranged to depress the unsupported material opposite the said space, and means for heating the guiding member.

18. A fused seam forming mechanism comprising co-operating members to engage the material to be sealed from opposite sides, one of said members having a clearance space and the co-operating member having means thereon to press against the unsupported material opposite the clearance space, and means for supplying heat to the depression caused by said co-operating members.

19. A fused seam forming mechanism comprising co-operating members to engage the material to be sealed from opposite sides, one of said members having a clearance space and the co-operating member having means thereon to press against the unsupported material opposite the clearance space, and means for supplying heat to the depression caused by said co-operating members, and means for adjusting the relative position of said members to each other.

20. In a bag machine, means for forming a seam between superposed thermoplastic plies of bag material comprising a pair of co-acting members positioned on opposite sides of said multiple plies, one of said members rendering support adjacent only to the area to be seamed and the other co-acting member projecting directly upon the area to be seamed to effect a tension in said plies, and means for applying heat to said area while so tensioned.

ROBERT MORRIS BERGSTEIN.